Aug. 21, 1962 W. E. FULLER 3,050,256
AUTOMATIC ELECTRICAL CONTROL APPARATUS WITH OVERSHOOT CONTROL
Filed July 28, 1959 2 Sheets-Sheet 1

*INVENTOR.*
WILLIAM E. FULLER
BY Arthur H. Swanson
ATTORNEY.

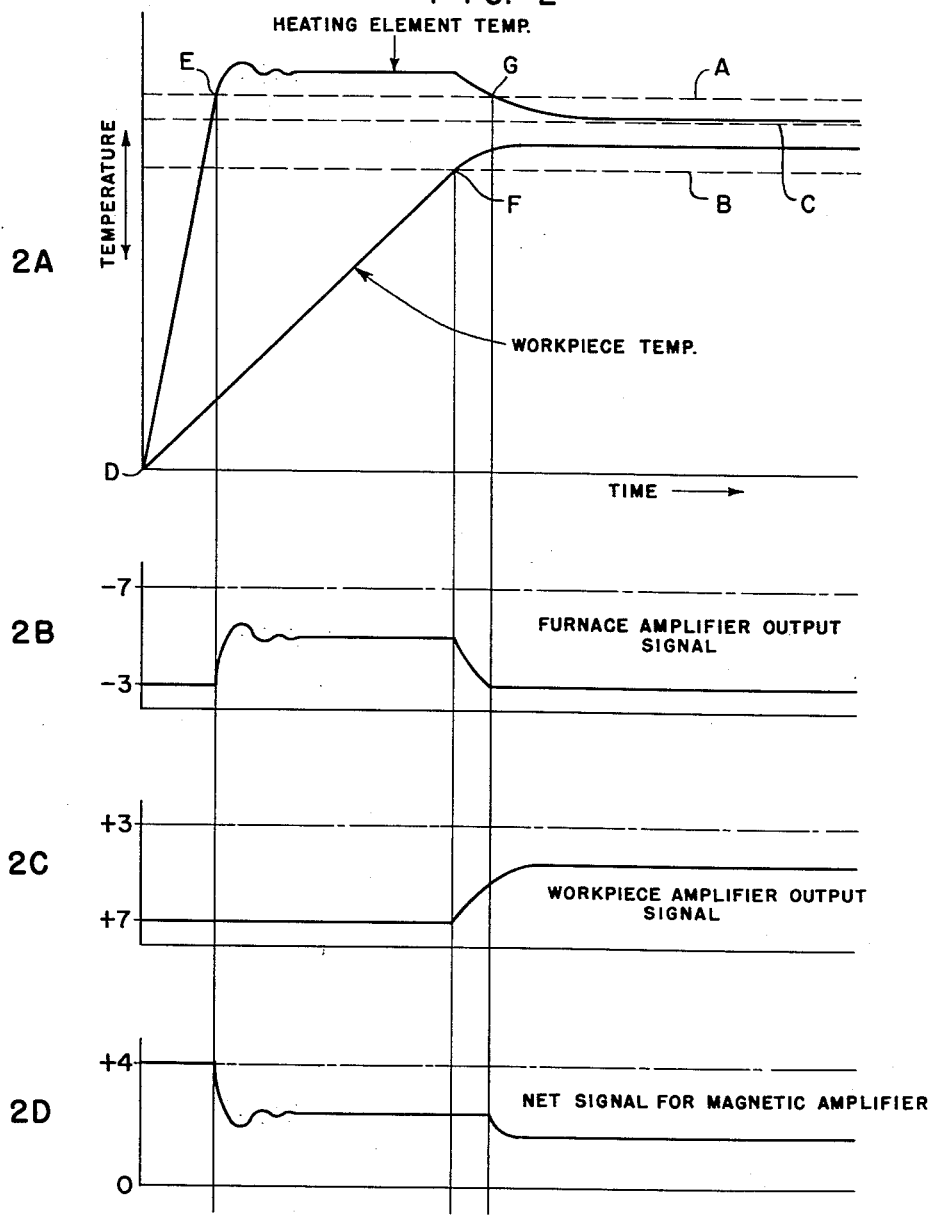

United States Patent Office 3,050,256
Patented Aug. 21, 1962

1

3,050,256
AUTOMATIC ELECTRICAL CONTROL APPARATUS WITH OVERSHOOT CONTROL
William E. Fuller, North Wales, Pa., assignor to Minneapolis-Honeywell Regulator Company, Minneapolis, Minn., a corporation of Delaware
Filed July 28, 1959, Ser. No. 830,126
10 Claims. (Cl. 236—15)

This invention relates to electrical control apparatus.

More specifically, the present invention relates to automatic electrical control apparatus featuring overshoot control.

In process control systems for controlling variable quantities such as temperature, pressure, etc., it is desirable to maintain the variable quantity at a predetermined magnitude, or setpoint. For example, in the operation of a furnace for heating an object, it is generally desirable to operate the furnace at a predetermined temperature.

It is, also, usually desirable to minimize the characteristic of a thermal system to continue to heat after the heating element is de-energized. This characteristic is known as thermal inertia. Particularly, in the initial heating period of the furnace from a low temperature to the desired temperature, the uncontrolled thermal inertia is effective to produce a fluctuation of the furnace temperature about the desired temperature. This effect is known as overshoot. In general, a greater measure of utility is obtained from the furnace where strict adherence to the desired temperature is maintained.

An object of the present invention is to provide an improved automatic electrical control apparatus for controlling the set-point approach rate of a variable quantity.

Another object of the present invention is to provide an improved electrical control apparatus for automatically controlling the magnitude of a variable with a minimum of variation.

Still another object of the present invention is to provide an improved electrical control apparatus for preventing overshoot of the initial magnitude of an increasing variable with respect to a set point.

A further object of the present invention is to provide an improved automatic electrical control apparatus, as set forth, which is characterized by simplicity of operation and construction.

In accomplishing these and other objects, there has been provided, in accordance with the present invention, an electrical control apparatus utilizing a saturable reactor for controlling input power to a furnace heating element. A pair of temperature sensing elements are used to sense the temperature of the furnace heating element and the temperature of an object to be heated, respectively. The output signals from the two sensing elements are fed to separate signal responsive devices to produce corresponding unidirectional control signals. These control signals are applied as input signals to a magnetic amplifier in an opposing relationship with respect to each other. The resulting difference signal is amplified by the magnetic amplifier to produce a control signal for the aforesaid saturable reactor. The power supplied to the furnace heating element, consequently, is controlled by the difference of the input signals to the magnetic amplifier.

A better understanding of the present invention may be had from the following detailed description when read in connection with the accompanying drawings, in which:

FIG. 2 is a representation of the operating waveshapes occurring in the apparatus shown in FIG. 1.

Figure 1:
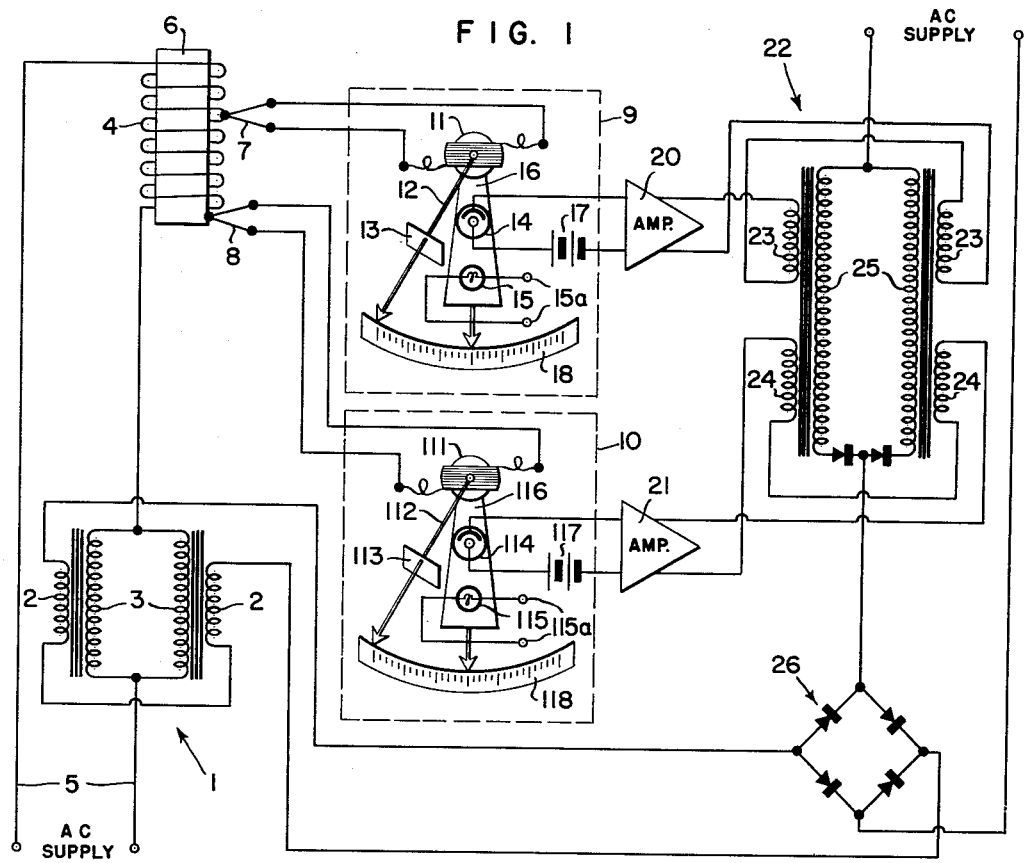
FIG. 1 is a schematic representation of an automatic electrical control apparatus embodying the present invention.

Referring to FIG. 1 in more detail, there is shown a saturable reactor 1 having a saturating winding 2 and a power winding 3, shown as two parallel windings.

The power winding 3 is connected in series with a furnace heating element 4. This series combination is supplied with an alternating current energizing signal through a pair of connecting wires 5 from an alternating current supply designated in FIG. 1 as an "A.C. Supply." An object to be heated, or workpiece, 6 is shown within the operative area of the heating element 4. A furnace thermocouple 7 is used to sense the temperature of the heating element 4. Similarly, an object thermocouple 8 is used to sense the temperature of the workpiece 6. It is appreciated that the simplified representation of the thermocouples 7 and 8 may include cold junctions, thermocouple burnout circuits, etc., such elements being well-known in the art.

The output signal from the furnace thermocouple 7 is applied to a first vane-type photoelectric controller 9. The output signal from the object thermocouple 8 is similarly connected to a second vane-type photoelectric controller 10. The controllers 9 and 10 may each be a device as manufactured by the Brown Instruments Division of Minneapolis-Honeywell Regulator Company and designated as 'Model 105R12 Current-Proportioning Controller." This device is shown and described in an instruction manual designated as "Manual 105R12, PS26, III, Iv B" particularly in Section 2007–E, pages 1 and 2, thereof. The device comprises an electrical meter movement having a pointer carrying an opaque vane. The vane is arranged to pass between a cadmium-selenide photocell and a light source to vary the light transmission therebetween. Thus, the movement of the meter pointer produces an effect on the photocell only when the meter movement input signal is sufficient to move the vane in front of the light source. The light source and the photocell are mounted on a movable arm to permit a variation in the point at which the vane movement reaches the light source. A graduated scale is positioned in front of the aforesaid meter pointer and movable arm to visually indicate the relative positions thereof.

As shown in FIG. 1 of the instant case, the controllers 9 and 10 each include a meter movement 11, 111 having a pointer 12, 112. An opaque vane 13, 113 is mounted on the pointer 12, 112. A photocell 14, 114 and a light source 15, 115 are mounted on a movable arm 16, 116. The light source 15, 115 is energized by an alternating current supply, not shown, connected to a pair of terminals 15a, 115a. A battery 17, 117 is connected to the photocell 14, 114 to apply a unidirectional signal thereto. The photocell 14, 114 may be any suitable type which exhibits a variable resistance characteristic inversely proportional to the light incident thereon. A graduated scale 18, 118 is positioned in front of the aforesaid pointer 12, 112 and the movable arm 16, 116 to visually indicate the relative positions thereof.

The output signal from the photocell 14 of the furnace temperature responsive controller 9 is applied to a furnace signal amplifier 20; the output signal from the photocell 144 of the workpiece temperature responsive controller 10 is applied to workpiece signal amplifier 21. The furnace signal amplifier 20 is arranged to produce an output signal which is the inverse of the amplifier input signal; i.e., the output signal increases when the input signal decreases and vice versa. The workpiece signal amplifier 21, on the other hand, is arranged to produce an output signal which varies directly with the amplifier input signal.

The output signals from the two amplifiers 20 and 21 are applied to separate control windings of a magnetic amplifier 22. A suitable device for the magnetic amplifier 22 is manufactured by the Brown Instruments Division of the Minneapolis-Honeywell Regulator Company, Philadelphia, Pa. and designated as Part No. 365235–1. The output signal from the furnace signal amplifier 20 is applied to a first control winding 23 of the magnetic amplifier 22; the output signal from the workpiece signal amplifier 20 is applied to a second control winding 24 thereof. The aforesaid amplifier output signals are applied in an opposing relationship to produce an output signal from the magnetic amplifier 22 which is representative of the difference of these amplifier output signals.

A gate winding 25, shown as two parallel windings, of the magnetic amplifier 22 is connected in a series circuit supplied by a source of alternating current, which source is indicated in FIG. 1 as "A.C. Supply." This is not a common supply with the aforementioned "A.C. Supply" connected to the saturable reactor 1 and is of a smaller order of magnitude as compared therewith. A rectifier bridge circuit 26 is connected to the gate winding 25 to rectify the alternating current signal, from the "A.C. Supply," passing through the gate winding 25. A unidirectional output signal from the rectifier circuit 26 is applied to the saturating winding 2 of the saturable reactor 1 to control the alternating current supplied to the furnace heating element 4.

The mode of operation of the embodiment of the present invention, illustrated in FIG. 1, follows:

Assume the furnace heating element 4 and the workpiece 6 are initially in an unheated, or a so-called room temperature condition. At this time, the set-point arm 16 of the furnace responsive controller 9 is positioned at a desired point with respect to the scale 18. This point corresponds to a desired limiting temperature or set-point of the furnace heating element 4 after a heating operation thereof.

Similarly, the set-point arm 116 of the workpiece responsive controller 10 is positioned at a desired working temperature or set-point of the workpiece 6 after the heating operation of the furnace element 4.

The output signal from the furnace thermocouple 7 at the aforementioned unheated condition is a relatively low level signal as compared with the signal developed when the furnace element 4 is in a heated condition. The application of this low level signal to the meter movement 11 of the furnace responsive controller 9 is effective to produce a small arcuate movement of the pointer 12 and the vane 13. In this initial position, the vane 13 is ineffective to interrupt the incident radiation on the photocell 14. Similarly, the initial low level signal from the workpiece thermocouple 8 is ineffective to move the vane 113 to interrupt the incident radiation on the photocell 114 of the workpiece responsive controller 10.

However, as the desired set-points of the furnace element 4 and the workpiece 6 are approached, the thermocouple output signals increase until they are effective to move the vanes 13 and 113 to interfere with the incident radiation on the corresponding photocells 14 and 114. The aforementioned set-point adjustments are made to allow the furnace responsive controller 9 to reach its set-point range; i.e., begin to block the incident radiation on the photocell 14, before the workpiece responsive controller 10 reaches its set-point range.

Since the photocells 14, 114, as previously mentioned, are arranged to have a low resistance in response to a high level of illumination, the batteries 17, 117 of each controller 9 and 10 are arranged to supply substantially identical output signal with similar input signals thereto.

As previously discussed, the output signal from the furnace signal amplifier 20 is inversely proportional to the input signal thereto. Thus, the initial high amplitude signal from the furnace responsive controller 9 is effective to produce a relatively small amplitude output signal from the furnace signal amplifier 20. Conversely, the initial high amplitude output signal from the workpiece responsive controller 10 is effective to produce a high amplitude output signal from the workpiece signal amplifier 21. The output signals from the amplifiers 20 and 21 are applied in an opposing relationship to the respective control windings 23 and 24 of the magnetic amplifier 22. The large difference signal produced by these opposing input signals is arranged to saturate the magnetic amplifier 22, thereby permitting a high amplitude alternating current signal from the "A.C. Supply" to be fed to the rectifier circuit 26.

This large alternating current signal is rectified by the rectifier circuit 26 to a high amplitude unidirectional signal which is applied to the saturating winding 2 of the saturable reactor 1.

The high amplitude unidirectional signal is effective to saturate the saturable reactor 1. The saturation of the reactor 1 lowers the impedance of the power winding 3 to permit a maximum energization of the furnace heating element 4 by an alternating current signal fed along the connecting wires 5.

Referring to FIG. 2, there are shown the operating waveshapes for the apparatus shown in FIG. 1. The waveshapes labeled 2A represent the temperature rise of the heating element 4 and the workpiece 6 with respect to time. The temperature level indicated at A is the furnace temperature at which the output signal of the heating element thermocouple 7 is effective to move the vane 13 of the furnace responsive controller 9 to begin blocking the incident radiation on the corresponding photocell 14. Similarly, the temperature level indicated at B is the workpiece temperature which is effective to begin blocking the incident radiation on the photocell 114 of the workpiece responsive controller 10. Both of the aforementioned temperature levels are determined by the preset position of the movable arm 16, 116 of each controller 9 and 10. The point labeled D represents the initial temperature of the heating element 4 and the workpiece 6; e.g., room temperature. The point labeled E represents the point at which the output signal of the heating element thermocouple 7 reaches an amplitude which is effective to begin blocking the incident radiation on the photocell 14 of the furnace responsive controller 9. In other words, the increase in temperature of the heating element 14 along the curve labeled "Heating Element Temperature" from the initial point D is not effective to change output signal from the furnace responsive controller 9 until the point E is reached. Similarly, the point labeled F represents the point at which the output signal of the workpiece thermocouple 8 is effective to begin blocking the incident radiation on the photocell 114 of the workpiece responsive controller 10.

The waveshapes labeled 2B, 2C, and 2D represent, respectively, the output signal from the furnace responsive controller 9, the workpiece responsive controller 10 and the net input signal to the magnetic amplifier 22. The numerical values shown along the ordinates of the aforesaid curves 2B, 2C, and 2D are representative values for the purpose of simplifying the explanation of the operation of the circuit shown in FIG. 1.

As previously mentioned, the output signals from the controllers 9 and 10 are constant high amplitude signals until the corresponding vanes 13 and 113 interrupt the incident radiation on the photocells 14 and 114; i.e., the points labeled E and F in the waveshape diagram 2A. The initial output signal from the furnace responsive controller 9 as shown in waveshape diagram 2B is arranged to have a constant minimum value of a negative three units; e.g., −3 ma. The initial output signal from the workpiece controller 10 is, as previously discussed, a maximum amplitude signal having an opposite polarity with respect to the output signal from the furnace controller 9 and is shown in diagram 2C as a positive seven unit signal; e.g., +7 ma. The net signal affecting the magnetic amplifier 22 is the difference between these output signals and is shown in diagram 2D with an initial value of a positive four units; e.g., 4 ma.

As the temperature of the heating element 4 is increased, as shown in diagram 2A, to the point marked E, the vane 13 of the furnace responsive controller 9 starts to block the incident radiation on the photocell 14. A decrease in illumination of the photocell 14 is effective to increase the resistance thereof and, thereby, to decrease the output signal from the furnace responsive controller 9 which signal is applied to the furnace signal amplifier 20. A descrease in the input signal fed to the furnace amplifier 20 produces an increase in the output signal of the furnace signal amplifier 20 as applied to the first control winding 23 of the magnetic amplifier 22. This increase is effective to produce a greater opposing signal to the output signal from the workpiece responsive controller 10. The difference signal applied to the magnetic amplifier 22 is, consequently, decreased, as shown in diagram 2D after the first vertical line representing the point E. A decrease in the difference signal applied to the magnetic amplifier 22 is effective to produce a decrease in the saturation thereof and, consequently, a decrease in the magnetic amplifier output signal applied to the saturable reactor 1. Thus, the furnace responsive controller 9 controls the power applied to the heating element 4 to prevent damage thereto by excessive heating and to maintain the temperature thereof at a desired level as determined by the setting of the movable arm 16.

As shown in diagram 2A, the temperature of the heating element 4 is controlled at the preset level, after an initial transient heat lag effect, until the workpiece temperature reaches the preset control level B of the workpiece responsive controller 10. As previously mentioned, point F of diagram 2A represents the point at which the output signal of the workpiece responsive controller 10 starts to decrease. Since the workpiece amplifier 21 is arranged to produce a direct reproduction of an input signal thereto, the input signal to the second control winding 24 decreases in a direct relationship with the output signal from the workpiece responsive controller 10. The decrease of the input signal to the second control winding 24 momentarily decreases the net signal applied to the magnetic amplifier 22 since the output signal from the furnace signal amplifier 20 has previously settled to a constant amplitude. This momentary decrease of the net signal applied to the magnetic amplifier 22 is sensed by the furnace responsive controller 9 as a momentary decrease in temperature of the heating element 4 since a decrease in the magnetic amplifier output signal is effective to decrease the current supplied to the heating element 4.

The decrease in temperature of the heating element 4 is effective to move the vane 13 of the furnace controller 9 to allow an increase in the incident light on the photocell 14. An increase in the illumination of the photocell 14 is effective to increase the output signal of the furnace responsive controller 9, which output signal increase is inverted by the furnace amplifier 20 into a decrease in the input signal applied to the first control winding 23. It may be seen that the net signal resulting from the decrease of both input signals to the magnetic amplifier 22 is a constant value. This constant value is retained, as shown in diagram 2D, between the temperature points F and G, represented by the last two vertical lines, as a result of the continued decrease of the furnace responsive controller output signal in response to the continued decrease of the workpiece responsive controller output signal.

However, the furnace controller output signal cannot decrease beyond temperature point G, since at this point the vane 13 of the furnace responsive controller 9 has no effect on the incident light on the corresponding photocell 14; i.e., the vane 13 is completely out of the path of the incident light. Consequently, a further decrease of the output signal of the workpiece responsive controller 10 produces a decrease in the net signal applied to the magnetic amplifier 22. The control of the heating element 4 is, thus, transferred, after temperature point G, to the workpiece responsive controller 10 since any further variation of the workpiece responsive controller output signal directly affects the power supplied to the heating element 4. The temperature point G is arranged to occur at a point in time shortly prior to the time at which the temperature of the workpiece 6 reaches the desired level. Accordingly, the workpiece responsive controller 10 solely controls the temperature of the heating element 4 for a relatively short period of time before the preset workpiece temperature is reached. The initial temperature transients resulting from uncontrolled heating effects are, thus, eliminated, and the workpiece temperature is controlled at the preset temperature level, after a smooth transition from the period of heat up control, soley by the workpiece controller 10.

Thus, it may be seen that there has been provided, in accordance with the present invention, an automatic electrical control apparatus utilizing a magnetic amplifier which is characterized by the ability to prevent overshoot of the initial magnitude of a variable with respect to a set point and to control the variable with respect to the aforesaid set point.

What is claimed is:

1. An electrical control apparatus comprising, in combination, a first sensing means for sensing the condition of a first variable to be controlled to a predetermined value and operating to produce an output signal directly proportional to said first variable, a second sensing means for sensing the condition of a second variable to be controlled to a predetermined value and operating to produce an output signal directly proportional to said second variable, said first variable being representative of a first environmental condition and said second variable being representative of a second environmental condition with said first condition being dependent on said second condition and co-existing therewith, a first controller means responsive to said first sensing means to produce a first output signal, a second controller means responsive to said second sensing means in a manner similar to said first controller means to produce a second output signal, signal reversing means for reversing said second output signal with respect to said first output signal to convert said second output signal into an output signal from said reversing means which varies inversely with respect to said first output signal in response to similar variations in signals from said sensing means whereby the variations of said first output signal may be compensated by subtracting said output signal from said reversing means from said first output signal, amplifier means responsive to the difference of said first output signal and an output signal from said reversing means, to produce a control signal proportional thereto, and environmental condition control means responsive to said control signal for controlling said first environmental condition whereby to affect the condition of said first and second variables.

2. An electrical control apparatus comprising, in combination, a first sensing means for sensing the condition of a first variable to be controlled to a predetermined value and operating to produce an output signal directly proportional to said first variable, a second sensing means for sensing the condition of a second variable to be controlled to a predetedmined value and operating to produce a signal directly proportional to said second variable, said first variable being representative of a first environmental condition and said second variable being representative of a second environmental condition with said first condition being dependent on said second condition and co-existing therewith, a first photoelectric controller means, said controller means being responsive to said first sensing means to produce a first output signal, a second photoelectric controller, said second controller being responsive to said second sensing means in a manner similar to said first controller means to produce a second output signal, signal reversing means for reversing said second output signal with respect to said first output signal to convert said second output signal into an output signal from said reversing means which varies inversely with respect to said first output signal in response to similar variations in signals from said sensing means whereby the variations of said first output signal may be compensated by subtracting said output signal from said reversing means from said first output signal, amplifier means responsive to the difference of said first output signal and an output signal from said reversing means, to produce a control signal proportional thereto, and environmental condition control means responsive to said control signal for controlling said first environmental condition whereby to affect the condition of said first and second variables.

3. An electrical control apparatus comprising, in combination, a first sensing means for sensing the condition of a first variable to be controlled to a predetermined value and operating to produce an output signal directly proportional to said first variable, a second sensing means for sensing the condition of a second variable to be controlled to a predetedmined value and operating to produce an output signal directly proportional to said second variable, said first variable being representative of a first environmental condition and said second variable being representative of a second environmental condition with said first condition being dependent on said second condition and co-existing therewith, a first photoelectric controller means, said controller means being responsive to said first sensing means to produce a first output signal, a second photoelectric controller, said second controller being responsive to said second sensing means in a manner similar to said first controller to produce a second output signal, said first and said second controllers each including a photocell, a light source arranged to illuminate said photocell, a meter movement, a pointer actuated by said meter movement and an opaque vane attached to said pointer and arranged to pass between said photocell and said light source to interrupt the radiation incident on said photocell, signal reversing means for reversing said second output signal with respect to said first output signal to convert said second output signal into an output signal from said reversing means which varies inversely with respect to said first output signal in response to similar variations in signals from said sensing means whereby the variations of said first output signal may be compensated by subtracting said output signal from said reversing means from said first output signal, amplifier means responsive to the difference of said first output signal and an output signal from said reversing means, to produce a control signal proportional thereto, and environmental condition control means responsive to said control signal for controlling said first environmental condition whereby to affect the condition of said first and second variables.

4. An electrical control apparatus comprising, in combination, a first sensing means for sensing the condition of a first variable to be controlled, a second sensing means for sensing the condition of a second variable to be controlled, said first and said second variables being interdependent, a first controller means responsive to said first sensing means to produce a first output signal, a second controller means responsive to said second sensing means to produce a second output signal, signal reversing means for reversing said second output signal with respect to said first output signal to convert said second output signal into an output signal from said reversing means which varies inversely with respect to said first output signal in response to similar variations in signals from said sensing means whereby the variations of said first output signal may be compensated by subtracting said output signal from said reversing means from said first output signal, amplifier means responsive to the difference of said first output signal and an output signal from said reversing means to produce a control signal proportional thereto, and means responsive to said control signal to control the condition of said first variable to affect the condition of said first and second variables.

5. An electrical control apparatus comprising, in combination, a first sensing means for sensing the condition of a first variable to be controlled, a second sensing means for sensing the condition of a second variable to be controlled, said first and said second variables being interdependent, a first photoelectric controller means responsive to said first sensing means to produce a first output signal, a second photoelectric controller means responsive to said second sensing means to produce a second output signal, said first and second controllers each including a photocell, a light source arranged to illuminate said photocell, a meter movement, a pointer actuated by said meter movement and an opaque vane attached to said pointer and arranged to pass between said photocell and said light source to interrupt the radiation incident on said photocell, signal reversing means for reversing said second output signal with respect to said first output signal to convert said second output signal into an output signal from said reversing means which varies inversely with respect to said first output signal in response to similar variations in signals from said sensing means whereby the variations of said first output signal may be compensated by subtracting said output signal from said reversing means from said first output signal, amplifier means responsive to the difference of said first output signal and an output signal from said reversing means to produce a control signal proportional thereto, and means responsive to said control signal to control the condition of said first variable to affect the condition of said first and second variables.

6. An electrical control apparatus comprising, in combination, a first responsive means for sensing the condition of a first variable to be controlled to a predetermined value, said first means including means for producing a first output signal directly proportional to the condition of said first variable, a second responsive means for sensing the condition of a second variable to be controlled to a predetermined value, said second means including means for producing a second output signal directly proportional to said second variable and reversed with respect to said first output signal, said first variable being representative of a first environmental condition and said second variable being representative of a second environmental condition with said first condition being dependent on said second condition and co-existing therewith, said second output signal varying inversely with respect to said first output signal in response to similar variations in signals from said responsive means whereby the variations of said first output signal may be compensated by subtracting said second output signal from said first output signal, an amplifying means having two input circuits and an output circuit, said amplifying means being operative to produce a control signal in response to the difference in magnitude of the input signals applied to separate ones of said input circuits, means connecting said first output signal and said second output signal to separate ones of said input circuits, and environmental condition control means responsive to said control signal for controlling said first environmental condition whereby to affect the condition of said first and said second variables.

7. An electrical control apparatus comprising, in combination, a first responsive means for sensing the condition of a first variable to be controlled, said first means including means for producing a first output signal directly proportional to the condition of said first variable, a second responsive means for sensing the condition of a second variable to be controlled, said second means including means for producing a second output signal inversely proportional to said second variable, said second output signal varying inversely with respect to said first output signal in response to similar variations in signals from said responsive means whereby the variations of said first output signal may be compensated by subtracting said second output signal from said first output signal, said first and said second variables being interdependent, an amplifying means having two input circuits and an output circuit, said amplifying means being operative to produce a control signal in response to the difference in magnitude of the input signals applied to separate ones of said input circuits, means connecting said first output signal and said second output signal to separate ones of said input circuits, and means responsive to said control signal to affect the condition of said first and said second variables by controlling the condition of said first variables.

8. An electrical control apparatus comprising, in combination, a first photoelectric responsive means for sensing the condition of a first variable to be controlled, said first means including means for producing a first output signal directly proportional to the condition of said first variable, a second responsive means for sensing the condition of a second variable to be controlled, said second means including means for producing a second output signal inversely proportional to said second variable and varying inversely with respect to said first output signal in response to similar variations in signals from said responsive means whereby the variations of said first output signal may be compensated by subtracting said second output signal from said first output signal, said first variable and said second variable being representative of corresponding co-existing and interdependent environmental conditions, said first and said second means each including a photocell, a light source arranged to illuminate said photocell, a meter movement, a pointer actuated by said meter movement and an opaque vane attached to said pointer and arranged to pass between said photocell and said light source to interrupt the radiation incident on said photocell, an amplifying means having two input circuits and an output circuit, said amplifying means being operative to produce a control signal in response to the difference in magnitude of the input signals applied to separate ones of said input circuits, means connecting said first output signal and said second output signal to separate ones of said input circuits, and environmental condition control means responsive to said control signal to affect the condition of said first and said second variables.

9. An electrical control apparatus comprising, in combination, a first temperature sensing means, a second temperature sensing means, said first and said second temperatures being interdependent, and co-existing, a first controller means responsive to said first sensing means to produce a first output signal inversely proportional to said first temperature, a second controller means responsive to said second sensing means to produce a second output signal inversely proportional to said second temperature, signal reversing means for reversing said second output signal with respect to said first output signal to convert said second input signal into an output signal from said reversing means which varies inversely with respect to said first output signal in response to similar variations in signals from said sensing means whereby the variations of said first output signal may be compensated by subtracting said output signal from said reversing means from said first output signal, amplifier means responsive to the difference of said first output signal and an output signal from said reversing means, to produce a control signal proportional thereto, and temperature control means responsive to said control signal for controlling said first temperature whereby to affect said first temperature and said second temperature.

10. An electrical control apparatus comprising, in combination, a first temperature sensing means, a second temperature sensing means, said first and said second temperatures being interdependent with said first temperature being dependent on said second temperature, a first photoelectric controller means responsive to said first sensing means to produce a first output signal, a second photoelectric controller, said second controller being responsive to said second sensing means to produce a second output signal, said first and said second controllers each including a photocell, a light source arranged to illuminate said photocell, a meter movement, a pointer actuated by said meter movement and an opaque vane attached to said pointer and arranged to pass between said photocell and said light source to interrupt the radiation incident on said photocell, signal reversing means for reversing said second output signal with respect to said first output signal to convert said scond input signal into an output signal from said reversing means which varies inversely with respect to said first output signal in response to similar variations in signals from said sensing means whereby the variations of said first output signal may be compensated by subtracting said output signal from said reversing means from said first output signal, magnetic amplifier means responsive to the difference of said first output signal and an output signal from said reversing means, to produce a control signal proportional thereto, and temperature control means responsive to said control signal to control the magnitude of said second temperature to affect said first temperature and said second temperature.

References Cited in the file of this patent

UNITED STATES PATENTS

| | | |
|---|---|---|
| 1,603,729 | Wilhjelm | Oct. 19, 1926 |
| 2,218,502 | Breitenstein | Oct. 22, 1940 |
| 2,261,343 | De Florez et al. | Nov. 4, 1941 |
| 2,496,860 | Davis | Feb. 7, 1950 |
| 2,556,081 | Hartman | June 5, 1951 |
| 2,810,526 | Rogers | Oct. 22, 1957 |